J. L. BURNHAM.

Assignor to J. C. WANDS.

Car-Roof.

No. 8,383. Reissued Aug. 20, 1878.

8,383. CAR-ROOFS. J. L. Burnham, Nashville, Tenn., assignor to John C. Wa Patent No. 125,266, dated Apr. 2, 1872. Filed June 24, 1878.

*Brief.*—A roof composed of a support consisting of a layer of ened at their ends and extending longitudinally; upon these, pl wise, metallic strips, fastened at their inner-side edges and lap other sidewise; these, in turn, covered by boards crosswise and their ends.

*Claim.*—1. A car roof formed of longitudinal under-sheathing verse outer pieces C, combined with the intermediate longitudin metal D, arranged and applied as described.

2. The combination, in a car-roof, of an under bearing or suppo layer of sheathing, and an intermediate layer of metallic sheets, th ing upon the under bearing or support, and the upper layer of bo continuously upon the metallic sheets, for the purpose described.

3. In a car roof, a layer of metallic sheets resting upon an u or support, and a layer of sheathing resting continuously upon sheets, for the purpose described.

4. In a car-roof, the combination of a layer of metallic sheets other, and so as to move upon each other at their lapping edges, a layer of boards, the latter resting continuously upon the former, as described.

5. The sheets D D D, arranged longitudinally upon the supp and fastened at one side edge only thereto, substantially as descr 6. A car-roof having a layer of metallic sheets in part unfa support beneath, and an upper continuous layer of boards that are confined at their ends to said support, and that bear continuous metallic sheet, serving or aiding to hold the latter down upon sai 7. In a car-roof, the elastic strips d, substantially as describe 8. A car-roof having a continuous layer of metalic sheets s neath and confined above by supports that bear against and a with the intermediate sheets, the supports above being applied to the metallic sheets.

9. In a car-roof composed of a layer of metallic sheets and w ing, an under sheet arranged centrally upon the ridge of the roof lapping upon sheets lower down, and respectively upon the two roof.

10. The combination, in a car-roof, of the boards B, the sheet continuous layer of boards C, said boards B and C being in con sheets D, for the purpose of forming a strong, compact roof.

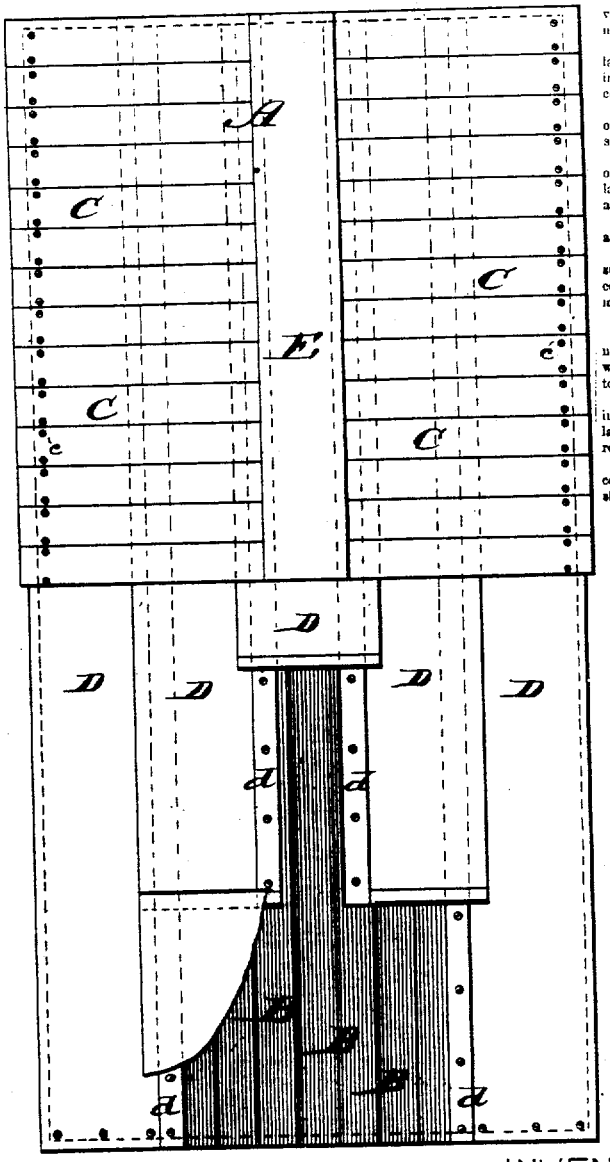

ATTEST.

A. R. Brown

Henry McDay

INVENTOR.

John C. Burnham by Chas. D. Woody atty.

N. PETERS, PHOTO-LITHOGRAPHER, WASHINGTON, D. C.

UNITED STATES PATENT OFFICE.

JOHN L. BURNHAM, OF NASHVILLE, TENNESSEE, ASSIGNOR TO JOHN C. WANDS, OF SAME PLACE.

IMPROVEMENT IN CAR-ROOFS.

Specification forming part of Letters Patent No. 125,266, dated April 2, 1872; Reissue No. 8,383, dated August 20, 1878; application filed June 24, 1878.

*To all whom it may concern:*

Be it known that I, JOHN L. BURNHAM, of Nashville, Tennessee, have made a new and useful Improvement in Car-Roofs, of which the following is a full, clear, and exact description, reference being had to the annexed drawing, making part of this specification, and being a plan of the improved roof, portions of the upper layers being removed to show the parts beneath.

My aim is to provide a strong, solid, durable roof.

Referring to the drawing, A represents a car-roof embodying the present improvement, having under-sheathing B, adapted to support an upper layer of boards, C, and a series of metallic sheets, D, arranged between the sheathing and boards. The boards B serve as an under bearing to the intermediate sheets D and boards C, and all are laid closely together for the purpose of forming a firm, solid, compact roof; and to further improve the construction, the boards B and sheets D are laid lengthwise upon the car, and the boards C are laid crosswise and continuously upon the sheets D. The latter are interlocked at their ends, and are arranged to lap upon each other sidewise, and are fastened in place by one side edge, as shown, and partly by the upper boards C pressing down upon the sheets D. One side edge of the metallic sheet is not rigidly fastened to the support beneath.

A rubber packing, *d*, may be inserted between the edges of the metallic sheets, as shown.

Suitable fastenings *c c* are used to confine the boards C C at the eaves of the roof. The boards C C are made preferably to project at the eaves slightly beyond the sheets D D. E represents the usual running-board.

I claim—

1. A car-roof formed of longitudinal under-sheathing B and transverse outer pieces C, combined with the intermediate longitudinal sheets of metal D, arranged and applied as described.

2. The combination, in a car-roof, of an under bearing or support, an upper layer of sheathing, and an intermediate layer of metallic sheets, the latter resting upon the under bearing or support, and the upper layer of boards resting continuously upon the metallic sheets, for the purpose described.

3. In a car-roof, a layer of metallic sheets resting upon an under bearing or support, and a layer of sheathing resting continuously upon the metallic sheets, for the purpose described.

4. In a car-roof, the combination of a layer of metallic sheets lapping each other, and so as to move upon each other at their lapping edges, and an upper layer of boards, the latter resting continuously upon the former, substantially as described.

5. The sheets D D D, arranged longitudinally upon the support beneath, and fastened at one side edge only thereto, substantially as described.

6. A car-roof having a layer of metallic sheets in part unfastened to the support beneath, and an upper continuous layer of boards that are fastened or confined at their ends to said support, and that bear continuously upon the metallic sheets, serving or aiding to hold the latter down upon said support.

7. In a car-roof, the elastic strips *d*, substantially as described.

8. A car-roof having a continuous layer of metallic sheets supported beneath and confined above by supports that bear against and are in contact with the intermediate sheets, the supports above being applied continuously to the metallic sheets.

9. In a car-roof composed of a layer of metallic sheets and wooden sheathing, an under sheet arranged centrally upon the ridge of the roof, and its sides lapping upon sheets lower down, and respectively upon the two slopes of the roof.

10. The combination, in a car-roof, of the boards B, the sheets D, and the continuous layer of boards C, said boards B and C being in contact with the sheets D, for the purpose of forming a strong, compact roof.

JOHN L. BURNHAM.

Witnesses:

WILLIS G. WILLIAMS,
FRANK R. JOHNSON.